March 26, 1929. J. L. HODGSON 1,707,160
FLUID METER
Filed Feb. 10, 1927  3 Sheets-Sheet 2
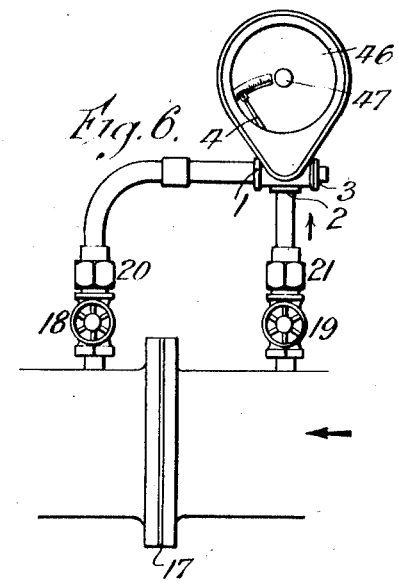
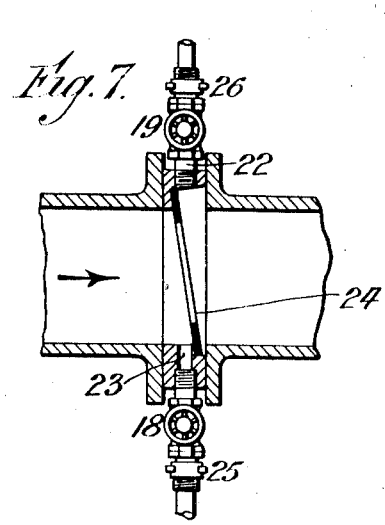
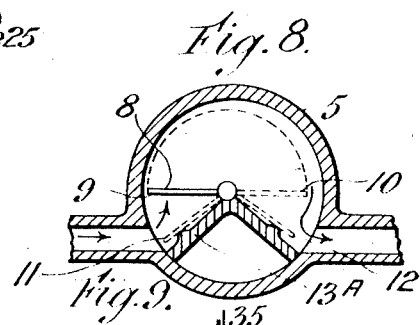
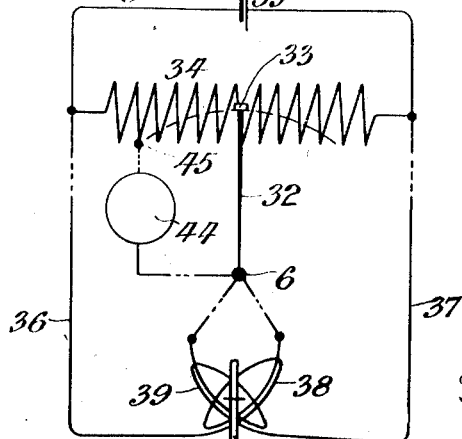
Inventor
John Lawrence Hodgson
by Baldwin Wight
his Attorneys

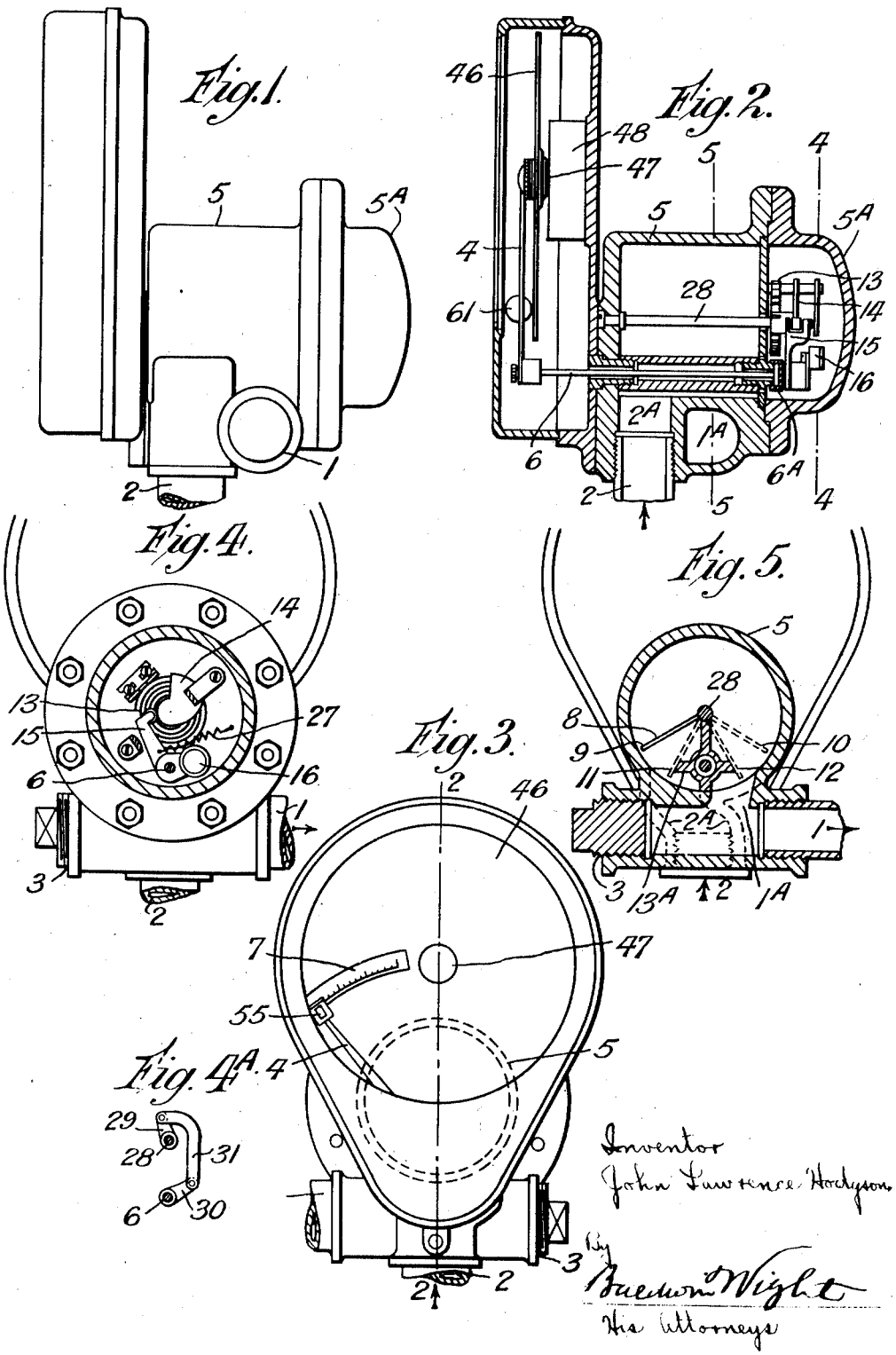

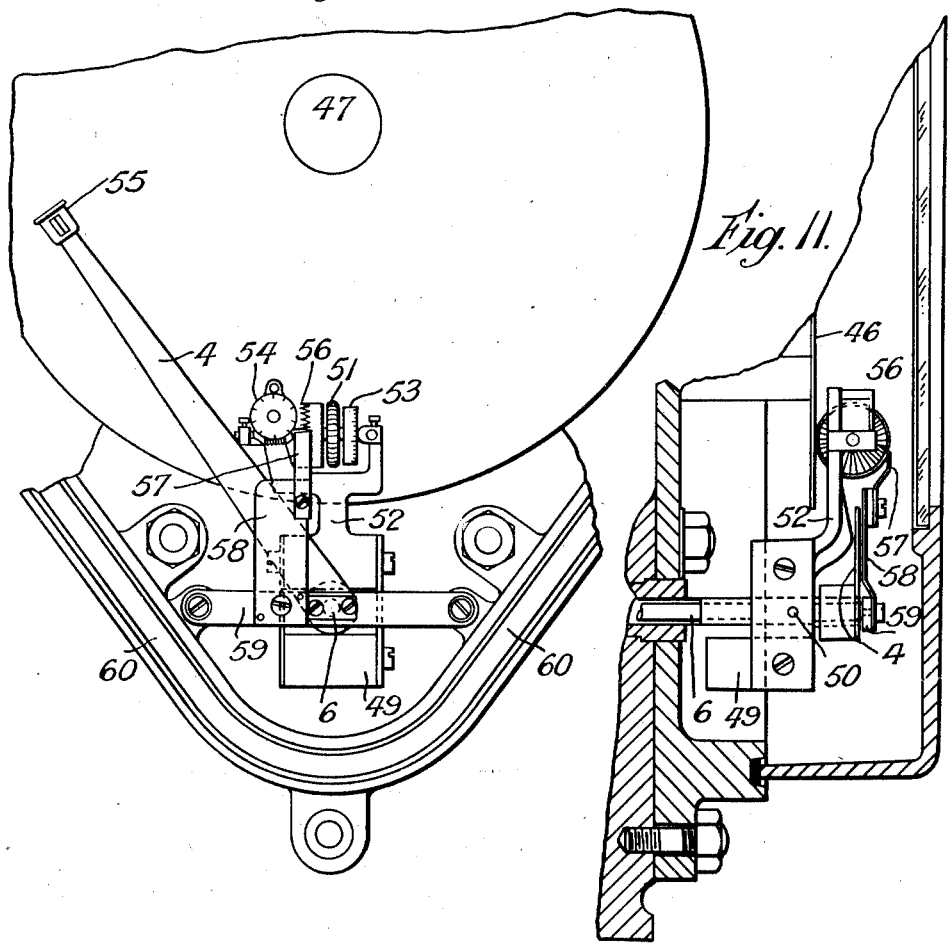

Patented Mar. 26, 1929.

1,707,160

UNITED STATES PATENT OFFICE.

JOHN LAWRENCE HODGSON, OF NEAR LEIGHTON BUZZARD, ENGLAND.

FLUID METER.

Application filed February 10, 1927, Serial No. 167,226, and in Great Britain March 27, 1926.

In certain cases, as when measuring compressed air which may deposit water or oil in the meter, it is desirable to obtain a motion depending upon the difference of pressure across an orifice or other obstruction by means other than any form of U tube or diaphragm mechanism, as these may be deranged or damaged by the deposition of liquid from the air or gas being measured, or by overload.

The present invention comprises such means.

It consists essentially of a gate having clearance all around its periphery which is pivoted approximately in the centre of a circular cavity in which a baffle plate is fitted so that the air entering on one side of the cavity has to pass the gate before leaving the cavity on the other side.

The angular movement of the gate from its zero position for any difference of pressure across the meter is determined by the couples which restrain its movement, which couples can be conveniently produced by suitably applied springs and weights (including the weight of the gate).

If the principal loading on the gate spindle is due to springs, the parts will be light and have small inertia, and no dashpot will be required on the meter; also the gate may have a large angular movement.

If the clearance between the walls of the cavity and the gate is the same for all angular positions which the gate may take up, the flows through a shunt circuit containing the gate and a main circuit containing an orifice, will be proportional. Hence, if a gate has been calibrated, and the resistance of the connecting pipes is made negligible (or is known and allowed for), it can be used as a flow measuring device across an orifice of any size without further calibration provided that the coefficient of discharge of the orifice in the main circuit is known from previous tests on similar orifices.

If the clearance between the gate and the walls of the cavity is not absolutely the same for all positions that the gate may take up, this can be neglected provided that it does not affect the proportionality of the flows within the limits of accuracy aimed at.

The motion of the gate may be caused to operate a pointer or a pen arm through a gland, either directly or by means of a link motion. Further, if any particular spacing is required on the indicating scale or the diagram, a cam and roller mechanism may be used.

The controlling spring and the link or the cam and roller mechanism are preferably placed in a chamber out of the main flow.

Any suitable form of integrating mechanism which will give a record of the total flow may be used in connection with the device.

The meter may also be fitted with an attachment which will enable the indication or record to be transmitted electrically to a distance.

In order that the indicating and recording parts of the meter may face in a given direction for either of the two possible directions of flow in the main circuit to which the shunt circuit containing the meter is attached, alternative exits from the circular cavity which face in opposite directions may be provided; the exit not in use being plugged up.

For low flows it is advantageous to pivot the gate out of centre so that for a total motion at 180° or less there is the least clearance between the gate and the walls of the cavity at low flows, and the greatest clearance at high flows; thus magnifying the motion of the gate at these flows.

In order that the meter may not be damaged by overload, or by being wrongly connected up, or when any sumps in the connecting pipes are blown out, the gate should be able to move below the zero and above the full load positions so as partially or wholly to uncover the inlet or outlet ports respectively, being supported by stops placed approximately at the centre of percussion of the gate, as when the ports are thus uncovered and the gate thus supported, there is no further strain on the gate or on the mechanisms attached thereto.

In the accompanying drawings which show an embodiment of my invention:

Figure 1 is a side elevation of the meter.

Figure 2 is a vertical cross section through the line 2—2 of Figure 3 with parts omitted.

Figure 3 is a front elevation of the meter showing the dial.

Figure 4 is a cross section through the line 4—4 of Figure 2. Figure 4A is an alternative construction of part of the mechanism shown in Figure 4.

Figure 5 is a cross section through the line 5—5 of Figure 2.

Figure 6 shows the pipe connections of the meter.

Figure 7 shows a suitable form of orifice in the main flow circuit and pipe connections therefor.

Figure 8 shows a modification of part of the constructions shown in Figure 5.

Figure 9 shows electrical indicating and integrating means.

Figures 10 and 11 show respectively a front elevation and a cross section of mechanical integrating means.

In the accompanying drawings, Figure 1 is a side elevation and Figure 3 a front elevation of a diagram recording meter with outlet and inlet pipes at 1 and 2 respectively. 3 is an alternative outlet pipe closed with a plug.

4 is a pen arm which traces a diagram on a record carried by a disk 46 mounted on a central spindle 47 which is rotated uniformly by any ordinary means not shown, such as clockwork indicated generally by 48. It acts in conjunction with an integrating device to be described later.

The pen arm 4 is attached to the spindle 6 which passes through a gland at 6$^A$ and is operated through a cam mechanism from a spring controlled gate in the circular cavity 5. By suitably filing the cam, the diagram may be spaced so as to show equal increments of the pen for equal increments in the flow, or it may be divided in any other desired way.

The pen arm may also indicate the flow on a scale 7.

A planimeter or other form of integrator, indicated generally in Figure 2 by the numeral 61, may be operated by the motion of the spindle 6, or the motion of this spindle may be used to change an electrical resistance or inductance so as to obtain an indication or counter or diagram record of the flow at a distance by electrical means.

Figure 2 is a section through the line 2—2 of Figure 3. It shows the ports 1$^A$ and 2$^A$, the gate chamber 5, and also the separate chamber 5$^A$ containing the spring and the cam and roller mechanism. The ports 1$^A$ and 2$^A$ are separated by a baffle 13$^A$.

Figures 4 and 5 are sections through the lines 4—4 and 5—5 of Figure 2 respectively.

Figure 5 shows the gate 8 in its initial and final and extreme positions 9, 10, 11 and 12, respectively. It will be seen that when the gate is in the positions 11 or 12 (due to the meter being wrongly connected up, or to sumps in the connecting pipes being blown out, or to overload) there is no further strain on the mechanism, as the gate is supported by the stops provided (the end of the baffle being tapered to allow this) and the ports are uncovered.

Figure 4 shows the spring 13 which controls the motion of the gate and the cam 14 and the roller arm 15 which give the necessary motion to the spindle 6. The balance weight 16 which keeps the roller up to the cam may alternatively be replaced by a spring 27 shown for convenience in the same figure as the weight.

It should be noted that the weight of the gate and magnitude of the couple due to the pressure of the roller have to be allowed for or compensated for when deciding upon the shape of the cam.

Figure 4$^A$ shows an alternative means for operatively connecting the spindle 6 with the axis of the gate. The latter indicated by the numeral 28 carries a crank 29. The spindle 6 carries a crank 30 and the two cranks are connected by a link 31.

Figure 6 shows the meter connected up across an orifice 17 placed between two flanges in a pipe line. Valves 18 and 19 and unions 20 and 21 may be introduced so that the meter can be removed from the pipe line while this is under pressure, or so that the meter can be used at a number of measuring points.

Figure 7 shows a horizontal section through a special form of orifice fitting which can be bolted in between two flanges, and which contains the downstream and upstream flow passages 22 and 23 respectively. The orifice 24 is put "on the skew" so that the fitting may be the minimum width for a given size of the flow passages.

The meter, if it is required to be portable, may be connected up to the unions 25 and 26 by means of flexible pipes.

If the working motion of the gate is restricted to about 180°, the gate may be put slightly out of centre at low flows so as to obtain smaller clearances and larger motions at these flows as shown in Figure 8. This, however, destroys the proportionality of the flows in the shunt and the main circuits. The arrangement is suitable when special sensitiveness at low flows is required.

Figure 9 is a diagram of electrical integrating and indicating means by which indications may be obtained at a distance. A conducting arm 32 corresponding to the pointer 4 is similarly mounted on the spindle 6 and carries a contact piece 33 which co-operates with a resistance 34 in circuit with a battery 35. Leads 36, 37, from the ends of the resistance are connected respectively to ratio coils 38 and 39 and thence to the arm 32 at the spindle 6. These coils operate a magnet 40 which carries an indicating hand 41 co-operating with a scale 42. 44 is an ampere hour meter connected up to the resistance at 45 and to the arm 32 at 6. It is operated by the potential across the resistance between the point 45 and the contact piece 33. The meter 44 constitutes a counter for the apparatus.

The cam 14 is shaped so that for each position of the contact 33 the meter 44 records correctly, and the scale 42 is spaced so that it shows the rate of flow of fluid corresponding to each position of the contact 33.

Figures 10 and 11 show the planimeter integrating device above referred to. Upon the spindle 6 which carries the pen arm 4 is suspended a block 49 by a pivot 50, which compels the block to turn with the shaft but allows the block to swing in a plane containing the axis of the spindle. The block carries a planimeter wheel 51 by means of a support 52 and the wheel 51 is kept in contact with the record disk 46 by the weight of the block 49. Counting and indicating wheels 53 and 54 are associated with the planimeter wheel in the usual way. When the support 52 and the wheel 51 are in the vertical position, the wheel remains stationary, but when tilted by movement of the spindle 6, the planimeter wheel turns and the indicating wheels show the area of the curve traced by the pen 55 or an area proportional thereto, and thus indicates the total amount of fluid passing in a given time.

In order to prevent actuation of the planimeter wheel when at its zero position, it carries on its axis a crown wheel 56 which engages with a fixed stop 57 attached to an upright 58 which is mounted on a cross-bar 59 which is fixed to the framing 60 of the instrument.

What I claim is:—

1. In means for measuring the flow of fluids in a main flow circuit, a shunt flow circuit of constant resistance and provided with a cavity, an axis in the said cavity, a gate mounted on the said axis having the same clearance area round its periphery for all working positions, yieldable means for resisting movement of the said gate, a baffle extending from the wall of the cavity to the said axis, inlet and outlet ports situated on opposite sides of the baffle, an obstruction of determined area situated in the main flow circuit for producing definite pressure differences as may be required across the gate at each rate of flow, and indicating means and means for actuating the said indicating means operated by the said gate.

2. In means for measuring the flow of fluids as claimed in claim 1, stops situated outside the normal range of movement of the gate adapted to arrest the movement of the gate in positions at which one or other of the ports is uncovered, which stops engage with the gate substantially at its centre of percussion.

3. In means for measuring the flow of fluids as claimed in claim 1, a chamber adjacent to said cavity and separate therefrom, said chamber being adapted to contain cam and roller mechanism adapted to actuate the indicating means.

4. In means for measuring the flow of fluids as claimed in claim 1, means providing two discharge portions in communication with said outlet port arranged for selective use to discharge on the down stream side of the obstruction in the main stream according to the direction of flow of the said main stream, and means for closing either of said discharge portions to confine the discharge to the other portion.

5. In means for measuring the flow of fluids as claimed in claim 1, a housing adapted for insertion between two adjacent sections of the main flow circuit pipe line, an oblique perforated partition extending across the said housing, and entrance and exit connections for the shunt circuit situated diametrically opposite one another in the said housing.

6. Means for measuring the flow of fluids as claimed in claim 1, in which the said indicating means comprises a spindle, means for operatively connecting the spindle with said gate, a weighted block pivoted on the said spindle, a planimeter carried by the said block, and a rotating disk, the planimeter being kept in operative contact with the said disk by the weight of the block.

7. Means for measuring the flow of fluids as claimed in claim 1, in which the said indicating means comprises a spindle, means for operatively connecting the spindle with said gate, a weighted block pivoted on the said spindle, a planimeter carried by the said block, a rotating disk, the planimeter being kept in operative contact with the said disk by the weight of the block, and means for preventing the actuation of the planimeter when in zero position.

In testimony that I claim the foregoing as my invention I have signed my name this 5th day of January 1927.

JOHN LAWRENCE HODGSON.